(12) United States Patent
LeBaron

(10) Patent No.: US 9,158,856 B2
(45) Date of Patent: Oct. 13, 2015

(54) AUTOMATIC GENERATION OF TASKS FOR SEARCH ENGINE OPTIMIZATION

(75) Inventor: Matt LeBaron, Salinas, CA (US)

(73) Assignee: TASKMASTER TECHNOLOGIES INC., Salinas, CA (US)

( * ) Notice: Subject to any disclaimer, the term of this patent is extended or adjusted under 35 U.S.C. 154(b) by 825 days.

(21) Appl. No.: 12/978,455

(22) Filed: Dec. 24, 2010

(65) Prior Publication Data

US 2012/0166413 A1    Jun. 28, 2012

(51) Int. Cl.
*G06F 17/30* (2006.01)
*G06Q 30/02* (2012.01)

(52) U.S. Cl.
CPC ........ *G06F 17/3089* (2013.01); *G06Q 30/0246* (2013.01); *G06F 17/30864* (2013.01)

(58) Field of Classification Search
CPC ............... G06F 17/30864; G06F 17/30867; G06F 17/3089; G06Q 30/02; G06Q 30/0246; G06Q 30/0247
USPC ................................. 707/709, 711
See application file for complete search history.

(56) References Cited

U.S. PATENT DOCUMENTS

| | | | | |
|---|---|---|---|---|
| 7,844,590 | B1* | 11/2010 | Zwicky et al. | 707/706 |
| 8,271,473 | B2* | 9/2012 | Berg | 707/708 |
| 2007/0156757 | A1* | 7/2007 | Tang et al. | 707/104.1 |
| 2008/0027812 | A1* | 1/2008 | Hsu et al. | 705/14 |
| 2008/0052278 | A1* | 2/2008 | Zlotin et al. | 707/3 |
| 2009/0132524 | A1* | 5/2009 | Stouffer et al. | 707/5 |
| 2009/0150372 | A1* | 6/2009 | Batista Reyes et al. | 707/5 |
| 2009/0292677 | A1* | 11/2009 | Kim | 707/3 |
| 2010/0114864 | A1* | 5/2010 | Agam et al. | 707/709 |

* cited by examiner

*Primary Examiner* — Shew-Fen Lin
(74) *Attorney, Agent, or Firm* — Soquel Group LLC

(57) ABSTRACT

A method and a device for search engine optimization, that receives an identifier that identifies a domain, one or more keywords for analysis relative to a search engine, and search engine usage data, for each received keyword, gathering search engine results data, for at least one received keyword, mapping the at least one keyword to at least one web page within the identified domain, said mapping based on at least one of said search engine usage data and said search engine results data, and for at least one of the received keywords, generating at least one instruction to modify a web page element in a web page to which the at least one received keyword is mapped.

14 Claims, 10 Drawing Sheets

SEO Instructions for GreatGreetingCards.com

*Display Instructions Interface 240*

| Prio | URL | Keyword | SEO Instruction | Page Element |
|---|---|---|---|---|
| 21 | /holiday/bossday.asp | bosses | Add "bosses" to the H1 Tag to optimize for "bosses day cards". | H1 Tag |
| 22 | /holiday/bossday.asp | cards | Add "cards" to the H1 Tag to optimize for "bosses day cards". | H1 Tag |
| 23 | /holiday/bossday.asp | bosses day cards | Add "bosses day cards" in the Meta Description Tag to optimize for "bosses day cards". | Meta Description Tag |
| 24 | /holiday/bossday.asp | bosses day 2010 | Add "bosses day 2010" to the Meta Description Tag for "bosses day 2010". | Meta Description Tag |
| 25 | /holiday/ | bosses | Add "bosses" to the URL to optimize for "bosses day 2010". | URL |
| 26 | /holiday/ | bosses | Add "bosses" to the Title Tag to optimize for "bosses day 2010". | Title Tag |
| 27 | /holiday/ | bosses day 2010 | Add "bosses day 2010" to the H1 Tag to optimize for "bosses day 2010". | H1 Tag |
| 28 | /holiday/ | bosses day 2010 | Add "bosses day 2010" to the Meta Description Tag to optimize for "bosses day 2010". | Meta Description Tag |
| 29 | /holiday/ | bosses | Add "bosses" to the Meta Keywords Tag to optimize for "bosses day 2010". | Meta Keywords Tag |
| 30 | /holiday/sweetday.asp | what | Add "what" to the URL to optimize for "what day is sweetest day in 2010". | URL |

*FIG. 2C*

AUTOMATIC GENERATION OF TASKS FOR SEARCH ENGINE OPTIMIZATION

FIELD OF THE INVENTION

The present invention relates to search engine optimization (SEO), specifically to the creation of instructions, or tasks, to be performed by a webmaster that improve the rankings of web pages in search engine results pages delivered by search engines.

BACKGROUND OF THE INVENTION

Keyword searches performed by users of search engines result in web pages, known as "search engine results pages" or SERPs, that include unpaid search listings, commonly referred to as "organic" search results, as well as paid search listings. Individuals skilled in the creation, updating, and optimization of web pages, referred to herein as "webmasters", can improve the placement of web pages in SERPS. Actions or methods that seek to obtain better positions among unpaid search listings are referred to as "search engine optimization" or simply SEO. SEO is typically targeted at the most popular search engines which currently include Google search, Microsoft Bing, and Yahoo!.

When a visitor, also referred to as a "user", clicks on a SERP listing, his/her browser is directed to a corresponding web page. The rate or percentage of time that a user clicks on a specific listing when presented with a search results page that includes the listing is referred to as a click through rate (CTR). Data published by companies that provide search engines shows that with few exceptions CTR improves monotonically as the position of a listing improves within a SERP. Thus, the first, or highest position on the search results page has the highest CTR and the lowest position on the page has the lowest CTR for all organic search results listings on the page. Accordingly, the goal of SEO is to improve the ranking or position of domains or web pages of interest in SERPs.

One approach to improving the position, or ranking, of a web page within a SERP is to adjust the content of the web page to better correspond to specific keyword searches. However, since webmasters often manage large numbers of web pages and large numbers of keywords it may be burdensome to assign or map individual keywords to web pages and then modify the content of the web pages accordingly. Thus, automated SEO tools that map keywords to web pages and that generate a list of instructions or tasks to modify the web pages so as to optimize the web pages for the mapped keywords are desirable.

SUMMARY OF THE DESCRIPTION

The present invention concerns search engine optimization (SEO), and automated tools that assist a webmaster to improve the ranking of web pages within search results pages. Aspects of the present invention provide systems and methods that enable webmasters to periodically generate a list of instructions to perform to improve web traffic and/or revenue resulting from web traffic to a web domain.

The present invention receives keywords and search engine usage data for a domain, gathers search engine results data for the keywords, analyzes the search engine usage data and search engine results data and maps the received keywords to individual web pages in the domain.

The present invention further generates a list of instructions to be performed by a webmaster to modify the content of the web pages to better target the web pages to the mapped keywords. In one embodiment, some of the instructions generated by the present invention optimize a web page for keyword-specific ranking factors that are taken into account by search engines in ranking web pages.

In one embodiment, the present invention generates instructions whose goal is to increase the amount of traffic to an identified domain as a result of keyword searches using the received keywords. In another embodiment, the present invention generates instructions whose goal is to increase the amount of revenue generated as a result of visits to an identified domain resulting from keyword searches using the received keywords.

BRIEF DESCRIPTION OF THE DRAWINGS

The subject invention will be more fully understood and appreciated from the following detailed description, taken in conjunction with the drawings in which:

FIG. 2C is an exemplary user interface that presents search engine optimization instructions generated by the subject invention for a domain;

DETAILED DESCRIPTION

Figure 1:
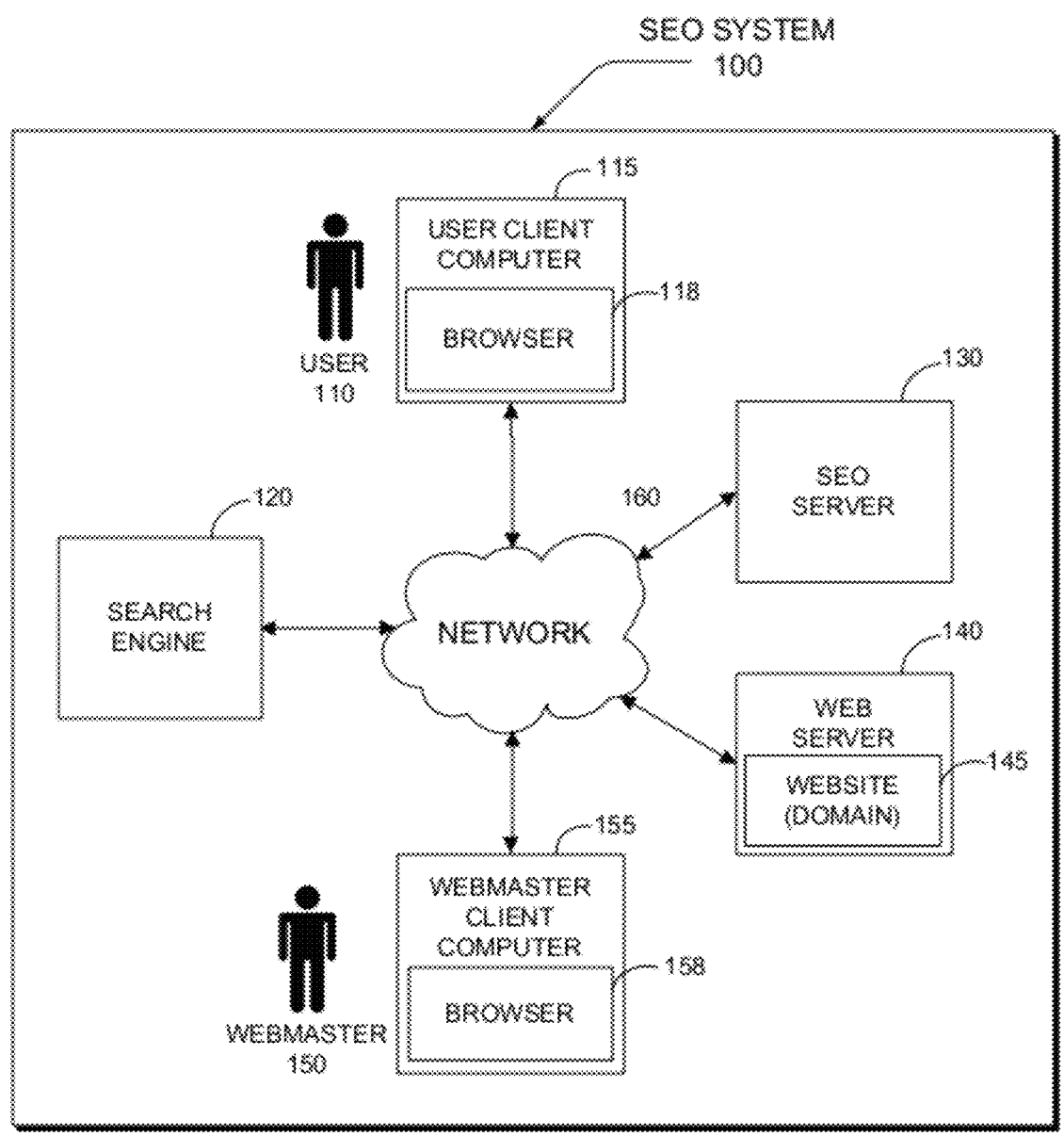
FIG. 1 is a simplified block diagram of a search engine optimization (SEO) system that automatically generates instructions or tasks which when implemented will result in increased traffic or revenue to a domain.

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods, processes, systems, business methods or devices. Accordingly, the present invention may take the form of an entirely hardware embodiment, an entirely software embodiment or an embodiment combining software and hardware aspects. The following detailed description is, therefore, not to be taken in a limiting sense.

As used herein the following terms have the meanings given below:

User—means an individual that uses a mobile device, PC or other electronic device to access services provided by the present invention across a network.

Webmaster—means an individual or entity that manages one or more web domains and or websites. As used herein, a webmaster is an individual, group of individuals, or entity that interacts with the subject invention using user interfaces such as those described with reference to FIGS. 2A-C.

Keyword or search term—refers to a word, words, phrase or sentence entered by a user into a search field in a web page, also referred to as a keyword query, which is then transmitted to a search engine that performs the requested search and returns results.

Search engine or Web search engine—means a computer server, or online service that receives keywords, typically as a result of a keyword query, uses the keywords to search for web pages that correspond to the keywords and returns a search engine results page (SERP) that lists the corresponding web pages. A search engine searches for information in the form of inter alia web pages and files on the World Wide Web and FTP servers. The search results are generally presented as a list, or sequence, of results in a search engine results page (SERP).

Search Engine Results Page (SERP)—means a list of web pages returned by a search engine in response to a keyword query. Each element in the list, i.e. each listing, typically includes a title, a link to the web page, and a short description showing where the keywords have matched content within the page. A SERP may refer to a single web page of links returned, or to the set of all links returned for a search query possibly spanning multiple web pages. Listings in a SERP are ranked where the numerical position starting from the top, or first, or highest, position is referred to simply as the position of the listing.

The subject invention determines which keywords should be mapped to web pages in a domain. Additionally, the subject invention optimizes the keyword to web page mapping by limiting the number of keywords mapped to a given web page based on search engine usage data or revenue data provided by search engines. Then, the subject invention generates instructions that specify changes that can be made to each web page by incorporating references to keywords mapped to the web page into various web page elements. When implemented, the specified web page changes improve the web page relative to "ranking factors" that are taken into account by search engines when computing the rank of a web page within a SERP.

Generalized Operation

The operation of certain aspects of the invention is described below with respect to FIGS. 1-8.

FIG. 1 is a simplified block diagram of a search engine optimization (SEO) system that automatically generates instructions or tasks which when implemented will result in increased traffic or revenue to a domain. A user 110 uses a web browser or other client application, referred to simply as browser 118, such as MICROSOFT INTERNET EXPLORER or MOZILLA FIREFOX, to visit a website that enables him/her to perform a keyword search. Browser 118 transmits the keyword to a search engine 120 that performs the requested search and returns one or more search engine results pages (SERPs) which are then displayed by browser 118. Each SERP includes one or more listings, each listing corresponds to a single web page that was determined by search engine 120 to match the keyword. Typically, a listing includes a text description of the web page contents and a web address or link in the form of a Uniform Resource Locator (URL) that uniquely identifies the web page. The web page belongs to a domain or a website 145 that is hosted by a web server or web service, referred to simply as web server 140. Web server 140 may host a plurality of domains. The web page may be static, i.e. existing as computer file in HTML format or another format or it may be dynamically generated. Further, web server 140 may provide e-commerce, enabling user 110 to purchase items, or otherwise perform transactions that generate revenue from website 145.

Webmaster 150 manages website 145 using a webmaster client computer 155. Webmaster 150 may use a variety of tools, applications and services to mange website 145. One such service is provided by a SEO server 130. In one embodiment, webmaster 150 interacts with SEO server 130 using web user interfaces such as those described with reference to FIGS. 2A-2C that run in a web browser, referred to as browser 158. In another embodiment, browser 158 may be implemented as a client application that interacts directly with SEO server 130. Further, SEO server 130 may provide web user interfaces in addition to or different than those illustrated below in FIGS. 2A-2C without departing from the spirit of the invention described herein.

SEO server 130 obtains information from webmaster client computer 155, SERPs from search engine 120 and web pages from web server 140 and analyzes this data, and generates instructions which when performed by webmaster 150 will result in increased traffic to and revenue from website 145. The instructions are described in web user interfaces, printed reports and downloadable files provided by SEO server 130. Generally, instructions can be provided by SEO server 130 in a variety of formats across a range of media and can be delivered in a variety of ways to webmaster client computer 155.

Figure 2A:
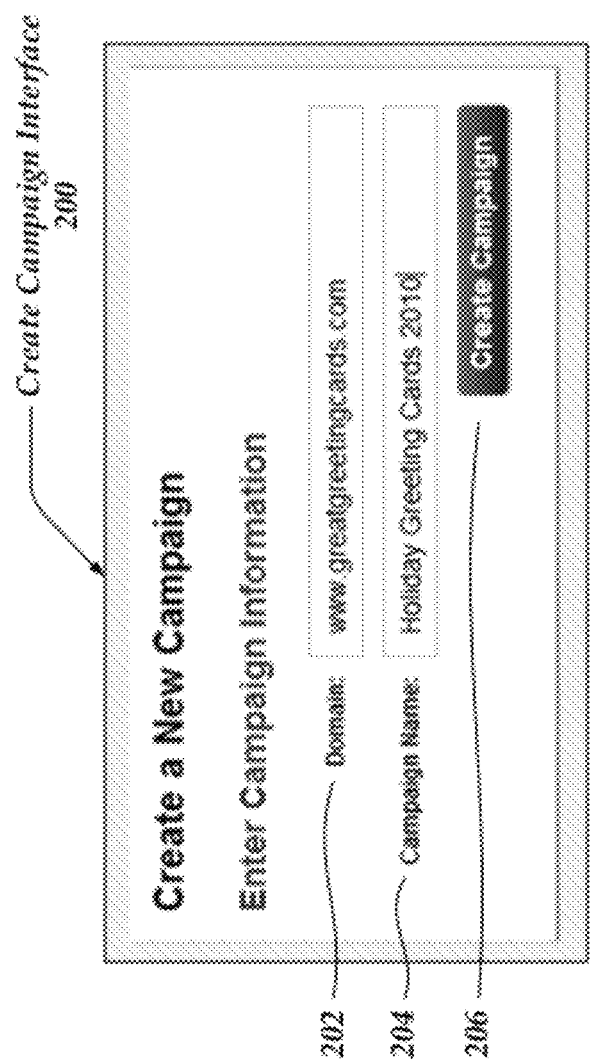
FIG. 2A is an exemplary user interface that enables a webmaster to create a search engine optimization campaign and identify a web domain for inclusion in said search engine optimization campaign.
Figure 2B:
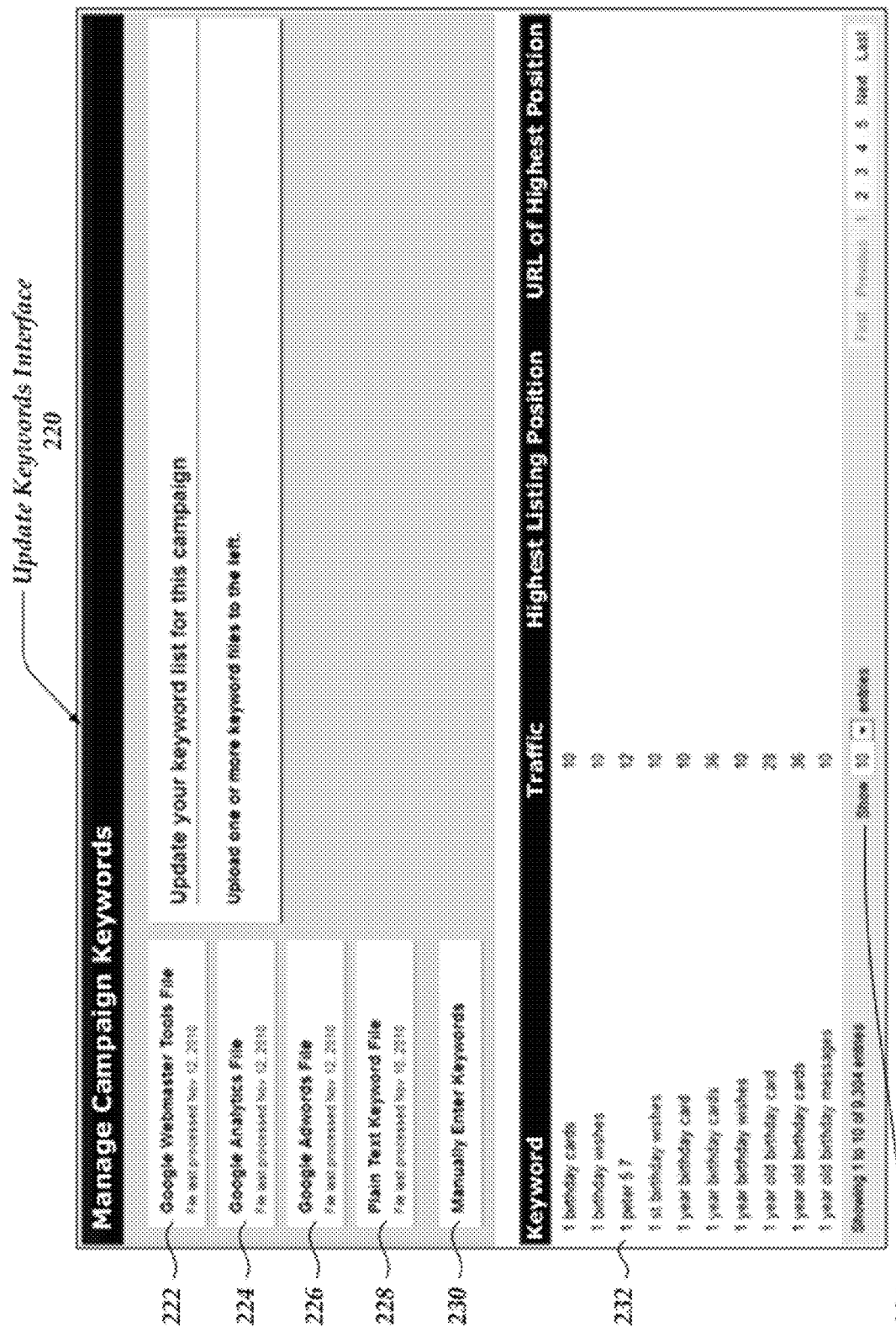
FIG. 2B is an exemplary user interface that enables a webmaster to review and update keywords to be included in a search engine optimization campaign.

Reference is now made to FIGS. 2A-2C which are example web user interfaces that enable webmaster 150 using browser 158 running in webmaster client computer 155 to interact with SEO server 130 which provides the web interfaces.

FIG. 2A is an exemplary user interface that enables a webmaster to create a search engine optimization campaign and identify a web domain for inclusion in said search engine optimization campaign. A create campaign interface 200 enables webmaster 150 to provide information that will be transmitted to SEO server 130 and used by SEO server 130 to initiate an analysis. A domain field 202 enables webmaster 150 to provide, or identify, the name of a web domain that will be analyzed. A campaign name entry field 204 enables webmaster 150 to provide a name for the campaign. The term "campaign" is used in a general sense; nothing in the invention limits its use only to marketing campaigns or SEO campaigns. The invention can be used to perform SEO analysis at any time and for any reason. It may be used periodically or on an ad hoc basis. Further, the subject invention may be used on a master domain such as the one given in the example, "greatgreetingcards.com", on a sub-domain such as "holidaycards-.greatgreetingcards.com/holidaycards", on a sub-directory such as "greatgreetingcards.com/photoholidaycards" or "holidaycards.greatgreetingcards.com/photo." More generally, the subject invention can be used on any collection of web pages.

FIG. 2B is an exemplary user interface that enables a webmaster to upload, review and update keywords to be included in a search engine optimization campaign. An update keywords interface 220 enables webmaster 150 to upload files containing keywords and traffic volume data, manually enter keywords, and to view and obtain information about keywords to be included in a subsequent SEO analysis. Controls 222-228 each enable webmaster 150 to upload a file that includes keywords in an industry-standard format. The invention is generally flexible in accommodating different file formats and additional file formats may be added. Using control 230 webmaster 150 can manually enter one or more keywords to be included. In addition to receiving files uploaded by webmaster 150 containing keywords and traffic volume data, the subject invention can directly access search engines and other online repositories using application programming interface (API) calls. Examples of online repositories that can be directly accessed by SEO server 130 include GOOGLE ADWORDS, GOOGLE ANALYTICS, and GOOGLE WEBMASTER TOOLS which support both file downloading and direct API access and WORDTRACKER from WORDTRACKER LLP of London, England.

A keyword window 232 displays all the keywords included in the selected SEO campaign. For each keyword included in the selected campaign, keyword window 232 lists the keyword in the leftmost column and provides three columns of related information for the keyword: "Traffic", "Highest Listing Position", and "URL of Highest Position".

The "traffic" column gives the estimated global monthly search volume for a given keyword across all major search engines, i.e. the sum of all the searches performed for the keyword across all search engines. Traffic for a keyword is made publically available by leading search engines. Traffic is typically given on a per month basis. Thus, values in keyword window 232 are typically for a month.

The "Highest Listing Position" column gives the average ranking or position of the highest average ranking web page within the identified domain across all search engines in a search results page when searching with the keyword. In other words, the highest listing position is average position, across one or more search engines, of the single web page in the domain that has the highest average ranking. The calculation of the highest listing position is described in further detail with reference to FIG. 3 below. The "URL of Highest Position" column gives the URL of the web page that corresponds to the highest listing position. The specific columns included in keyword window 232 are not intended to be limiting and thus more or fewer or different columns, containing different information about the keywords, may be included without departing from the spirit and scope of the invention.

A set of display controls 234 enable webmaster 150 to display the next group of entries (keywords), to go to the first, previous, next and last page or to a specific page.

FIG. 2C is an exemplary user interface that presents search engine optimization instructions generated by the subject invention for a domain. Display instructions interface 240 includes a title 242 that identifies the name of the domain being analyzed, in this case GreatGreetingCards.com. An instruction list 244 displays ten instructions, numbers 21 to 30. In a preferred embodiment, the instructions are listed in priority order, where smaller numbers indicate instructions that when implemented will result in greater traffic or greater revenue to the web page indicated in the column entitled "URL". A column entitled "keyword" lists the keyword that is being optimized for. A column entitled "SEO Instruction" lists each instruction, where the instruction describes a change to a web page to be performed by webmaster 150. A column entitled "page element" identifies an HTML tag, URL or other element related to a specific web page that is to be modified per the instruction.

A set of display controls 246 enable webmaster 150 to display the next group of instructions, to go to the first, previous, next and last page or to a specific page.

Figure 3:
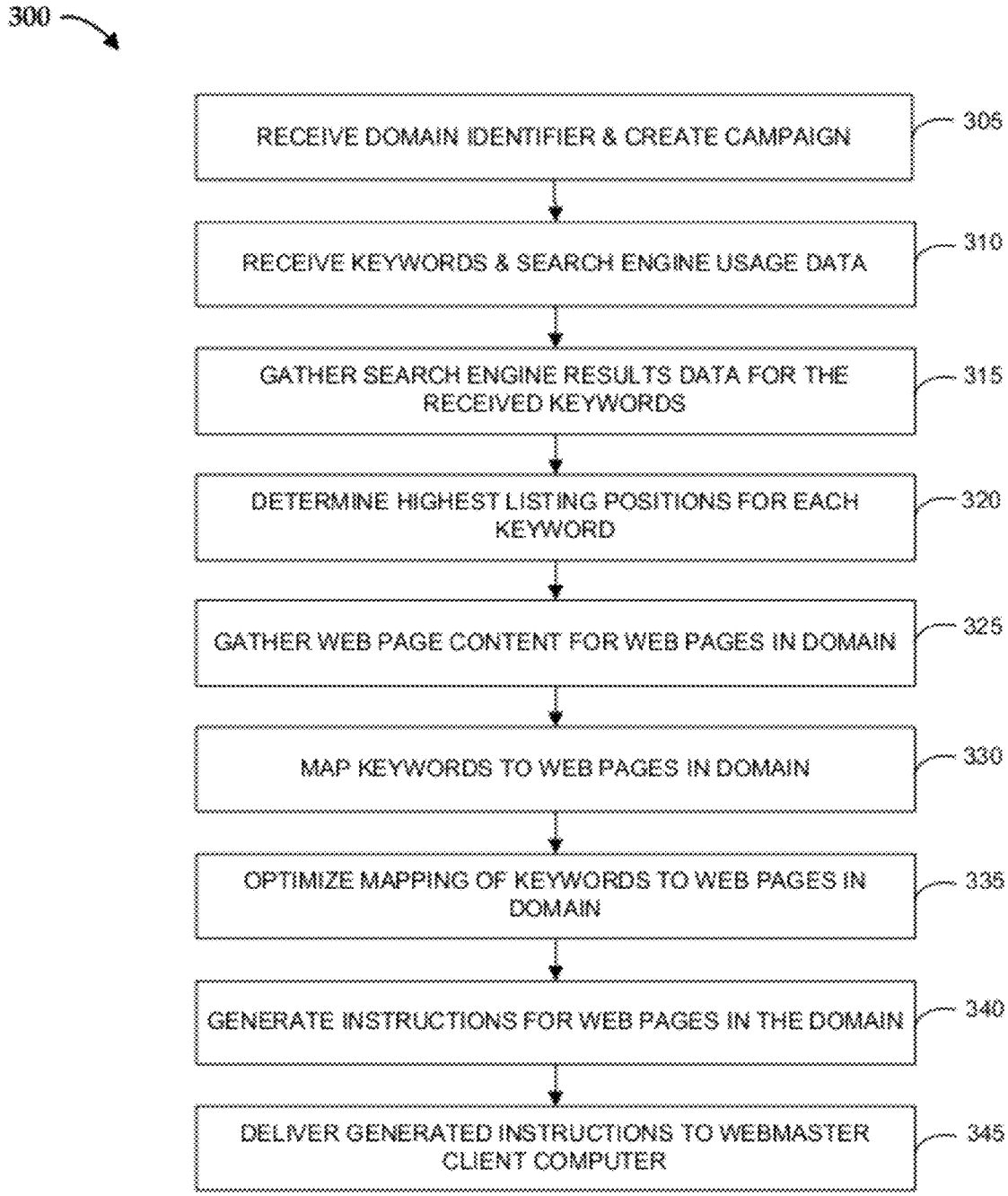
FIG. 3 is a simplified flowchart of an overall method for automatically generating search engine optimization instructions.

FIG. 3 is a simplified flowchart of an overall method for automatically generating search engine optimization instructions. The method of FIG. 3, referred to as SEO instruction generation algorithm 300, is performed by SEO server 130. At step 305 SEO server 130 receives an identifier, typically a URL, that identifies a domain, directory, or set of web pages, referred to simply as "the domain" or "the identified domain", for which instructions will be generated. This process is referred to as a campaign and SEO server 130 accordingly creates a new campaign record which it stores in a webmaster database, described in further detail with reference to FIG. 8.

At step 310 SEO server 130 receives keywords and search engine usage data corresponding to each of the keywords to be used in the subsequent analysis. In one embodiment, SEO server 130 receives one or more files that contain keywords and search engine usage data using an interface such as update keywords interface 220 that enables webmaster 150 to upload keyword files or to enter keywords. The received keywords typically include keywords that webmaster 150 has determined he/she wants the identified domain to rank well for with search engines. The received keywords may include additional keywords that are of little or no significance to the domain. The keyword file(s) typically includes search engine usage data pertaining to the domain for a month including the keywords entered by users of the search engine and for each keyword the number of resulting visits to web pages in the identified domain, the average number of pages visited on the domain, the average time spent on the site and so forth. Thus, a keyword file uploaded by webmaster 150 and received by SEO server 130 at step 310 typically includes, at a minimum, a list of keywords and, for each keyword, search usage data including the volume of traffic to the web page resulting from use of the keyword. Additionally, a keyword file may include revenue data for each keyword. Typically, per keyword revenue data included in a keyword file includes some or all of the following data values for a period of time: total revenue attributed to visitors to the domain as a result of searches using the keyword, the number of e-commerce transactions by visitors, the average value of each visit, the conversion rate (i.e. e-commerce transactions divided by the number of visits), and the revenue per visit (revenue for the period divided by the number of visits during the period), also referred to as the revenue per keyword visit. In a preferred embodiment, the subject invention computes revenue per keyword visit using other data values, such as revenue and the number of visits, if revenue per keyword visit isn't provided in a keyword data file. Typically, one keyword file includes data from a single search engine.

In another embodiment, SEO server 130 actively obtains keywords that are relevant to the identified domain from one or more search engines 120 using an application programming interface (API) provided by each of the search engines. For example, the SEO server 130 may obtain keywords relevant to the identified domain from the Google AdWords Keyword tool available from GOOGLE or use the Google Analytics Data Export API to obtain revenue data for keywords.

In another embodiment, SEO server 130 actively obtains search engine usage data, revenue data and any additional SEO data required to perform SEO instruction generation algorithm 300. For example, SEO server 130 can obtain search engine usage data and revenue data from the GOOGLE search engine as necessary using the Google Analytics Data Export API. Table 1 below identifies the key SEO data required and from where it is obtained.

TABLE 1

Inputs to SEO instruction generation Algorithm 300

| Input | Where/How Obtained |
| --- | --- |
| Domain of website | Received from webmaster 150 at step 305. May be a subdomain, directory or collection of web pages. |
| Target keywords | Received from webmaster 150 at step 310. |
| Search Engine (SE) Market Share | Search engine market share is published monthly by a variety of sources. For example, one public website that publishes this information is http://marketshare.hitslink.com. |
| Monthly Keyword Search Volume | Number of searches using the keyword performed by a search engine. Obtained from keyword files received from webmaster 150 at step 310. |
| Average Search Engine Results Page (SERP) click-thru rate (CTR) by position | Publicly available information. There are several publications that document the CTR for various positions on a SERP. One was published in a blog named SEO Scientist (www.seo-scientist.com) on Jul. 12, 2009. |
| Revenue Per Keyword Visit | The average amount of revenue that may be attributed to a visit to a domain as a result of searches using a specific keyword. Obtained from keyword files received from webmaster 150 at step 310. Alternatively, it may be obtained from search engines by SEO server 130. |
| Visits Per Keyword | The number of visits to a domain as a result of searches using a keyword. Obtained from keyword files received from webmaster 150 at step 310. Alternatively, it may be obtained from search engines by SEO server 130. |

In one embodiment, all keywords received are processed by the subject invention; in another embodiment, the number of keywords to be analyzed is limited to a specified number. In one embodiment, webmaster 150 uses a user interface control to specify whether or not to limit the number of keywords to analyze and to specify the limit value. In the case that a limit is set, there are a variety of ways to select the keywords to process from the set of received keywords. For example, the received keywords may be selected based on their corresponding search volumes or based on revenue per click or total revenue they generate. Thus, the set of keywords processed at subsequent steps by SEO instruction generation algorithm 300 may be a subset of the total collection of received keywords.

At step 315 SEO server 130 gathers search engine results data for the received keywords. In a preferred embodiment, SEO server 130 gathers a search engine results page (SERP) from each leading search engine 120 for each keyword. In one embodiment, a SERP is gathered for each keyword from only a single leading search engine, such as the GOOGLE search engine, and the results obtained for the single search engine are extrapolated across all search engines using search engine market share data, described above in Table 1.

At step 320 SEO server 130 determines the highest listing positions for each keyword. The highest listing positions are the highest average listing positions for web pages in the domain, across one or more search engines, for a keyword search. Typically, only the first N positions of a SERP, e.g. 100, are taken into account in order to optimize the speed of the computation. Each highest listing position is weighted by the volume of searches on a given search engine and rounded to the nearest integer. As an example of how to compute a highest listing position, if the identified domain is www.abc.com and the keyword is "red shoes", then if the web page www.abc.com/page25 appears in the 10th position in the SERP returned by the GOOGLE search engine, with 5000 searches, and in the 5th position on the YAHOO! search engine, with 2500 searches, then the highest listing position for the keyword to web page pair would be 8th (the weighted average is 8.33, which rounds to 8). Thus, one of the highest listing positions for "red shoes" is eight and the web page that corresponds to this highest listing position is www.abc.com/page25.

Thus, if only the first N highest listing positions are considered then from 0 to N highest listing positions may be determined for the keyword, although typically there are a relatively small number of highest listing positions for a particular keyword. Further, in some cases no highest listing positions will be found for a keyword. For example, if web pages for the domain "www.abc.com" appear for a search using "red shoes" in the 8th, 15th and 25th positions then three highest listing positions are determined corresponding to the keyword "red shoe". SEO server 130 stores in a keyword database, described further below with reference to FIG. 8, all highest listing positions for each keyword, including the keyword, the highest listing position value, and the URL of the web page that corresponds to each highest listing position for the keyword.

At step 325 SEO server 130 gathers the web page content for web pages in the identified domain and stores it in a web page database described in further detail below with reference to FIG. 6. This process is commonly referred to as "scraping" and is well known in the art. In one embodiment, only web pages identified in the previous step, step 320, as having a corresponding highest listing position are scraped and stored in this step. In another embodiment, each web page in the identified domain is scraped and stored.

At step 330 keywords are assigned, or mapped, to the various web pages in the identified domain. This step is described further below with reference to FIG. 4.

At step 335 the keyword to web page mapping performed in step 330 is optimized. In one embodiment, described below with reference to FIG. 5, the optimization consists of two steps: (1) limiting the number of keywords assigned to a web page to a designated maximum number, e.g. four; and (2) ensuring that each keyword is assigned to as many web pages as possible up to a specified maximum number, e.g. two.

At step 340, SEO server 130 analyzes each web page in the domain and generates instructions to modify web pages in the domain. This step is described further below with reference to FIG. 6.

At step 345 SEO server 130 delivers the instructions generated in the preceding step to webmaster client computer 155. Instructions can be presented via a user interface such as display instructions interface 240. Alternatively, instructions can be downloaded by webmaster 150 to webmaster client computer 155 from SEO server 130 or emailed to webmaster client computer 155 by SEO server 130. Generally, any method of providing the set of instructions to webmaster 150 may be supported by SEO server 130.

Figure 4:
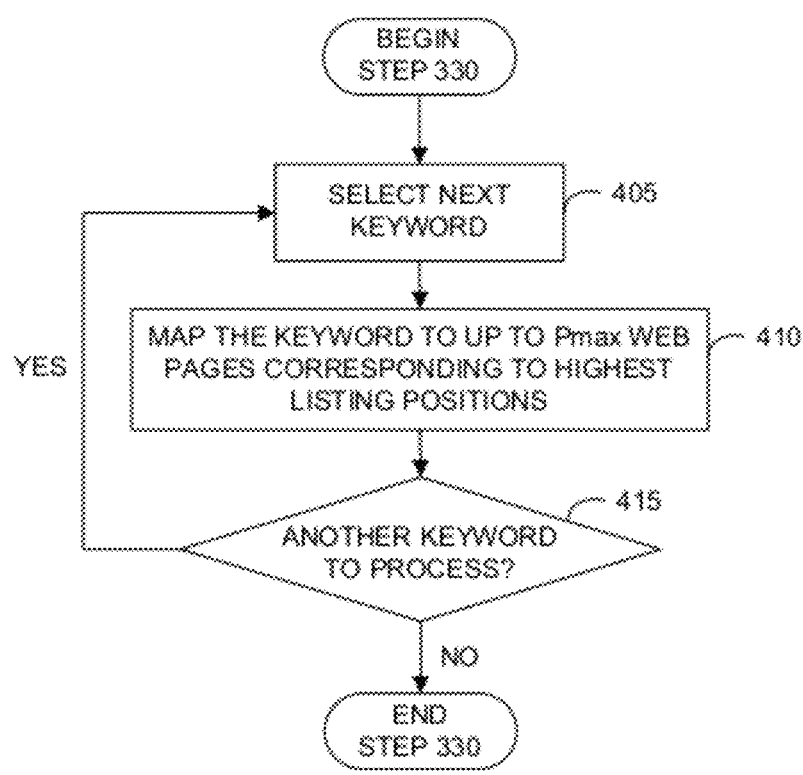
FIG. 4 is a simplified flowchart of a method for mapping keywords to web pages in a domain.

FIG. 4 is a simplified flowchart of a method for mapping keywords to web pages in a domain. The method iteratively processes all keywords. At step 405 SEO server 130 selects the next keyword. If it is the first iteration of the method then the first keyword in the list is selected for processing. At step 410 SEO server 130 maps, or assigns, the keyword to up to Pmax web pages, where Pmax is a nonzero integer and each web page corresponds to a highest listing position for the keyword, as determined at step 320. In an alternative embodiment, there is no limit on the number of web pages a single keyword can be assigned to.

At step 415 a determination is made as to whether there is another keyword remaining to process. If so, then processing returns to step 405, and if not then the method terminates.

Figure 5:
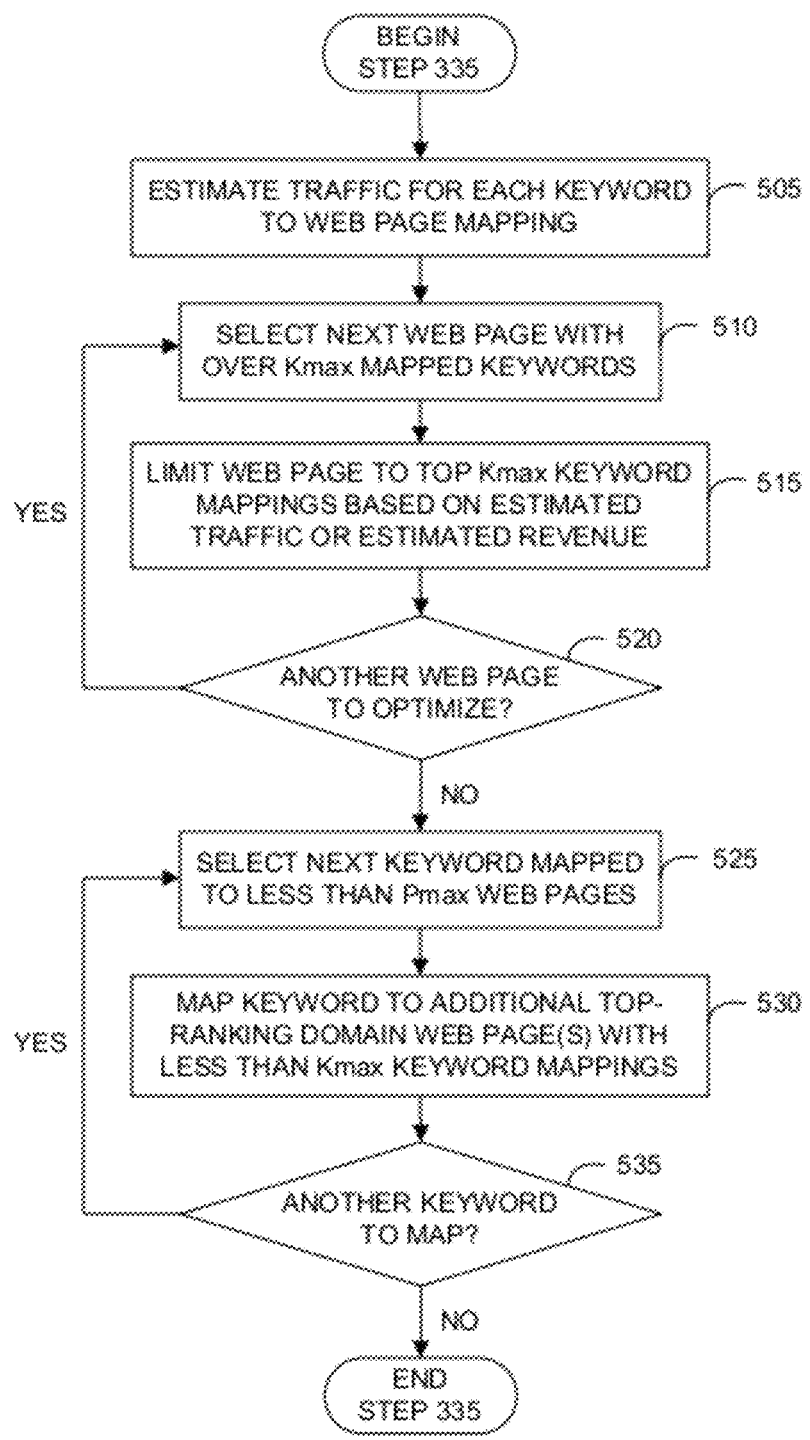
FIG. 5 is a simplified flowchart of a method for optimizing the mapping of keywords to web pages in a domain.

FIG. 5 is a simplified flowchart of a method for optimizing the mapping of keywords to web pages in a domain. There are two parts to the method. In the first part, the number of keywords assigned to a web page is limited to at most Kmax, a designated positive integer, and in the second part, a second pass of all keywords is performed to ensure that, where possible, a keyword is mapped to at least Pmax web pages where Pmax is a specified positive integer. As previously discussed, SEO best practices recommend that a single web page not be optimized for too many keywords. Thus, Kmax represents a limit to the number of keywords that a web page can be optimized for that is consistent with best practices. In a preferred embodiment, Kmax is set to four (4).

At step 505 traffic is estimated for each keyword to web page mapping determined above in step 330. For example, using an earlier example of the keyword-web page mapping "red shoe" to "www.abc.com/page25", the estimated traffic would be the number of visits to the web page "www.abc.com/page25" that resulted from keyword searches made by users, across all search engines, using the keyword "red shoe". Traffic can be estimated using the following equation:

$$\text{Traffic} = \sum_{i=1 \text{ to } c} (KV(i) * CTR(TP) * \text{Share}(i)) \quad \text{EQUATION 1}$$

where:

Traffic is the estimated monthly traffic across c selected leading search engine(s) for a keyword-web page mapping;

KV(i) is the monthly search volume for the keyword for a leading search engine i, received in step 310 above, i.e. taken from the received search volume data;

CTR(TP) is the click through rate of the highest listing position determined for the keyword-web page mapping for which traffic is being estimated, expressed as a fraction; and Share(i) is the market share of search engine (i) expressed as a fraction.

At step 510, SEO server 130 selects the next web page that has over Kmax keywords mapped to it. If it is the first iteration of the method then the first web page that has over Kmax mapped keywords is selected for processing.

At step 515, the number of keywords mapped to the web page are limited to Kmax based on estimated traffic for the keyword-web page mapping or, if available, based on estimated revenue for the keyword-web page mapping. In one embodiment, the keywords mapped to the web page are placed in descending order of estimated traffic, as calculated at step 505 using EQUATION 1, and the mappings for the first Kmax keywords, i.e. those with the highest estimated traffic, are retained. That is, the keyword that generates the most estimated traffic is first and the keyword that generates the least estimated traffic is last. In another embodiment, the Kmax keywords are placed in descending order of estimated revenue and the mappings for the first Kmax keywords, i.e. those with the highest estimated revenue, are retained.

Estimated revenue for a keyword-web page mapping is equal to the estimated traffic for the keyword-web page mapping, as given by Equation 1 multiplied by the revenue per keyword visit described in Table 1. It may be appreciated that if a keyword to web page mapping is not retained at this step then the number of mappings that include the keyword is diminished by one and thus falls below Pmax, the desired number of mappings for each keyword.

At step 520, if there is another web page with over Kmax keywords mapped to it then processing returns to step 510 and if not then processing continues at step 525.

Beginning at step 525 each keyword is iteratively reviewed to see if the number of web pages in the domain that it maps to has fallen below Pmax as a result of the processing performed in steps 505-520. Thus, at step 525, SEO server 130 selects the next keyword that is mapped to less than Pmax web pages in the domain. If it is the first iteration then the first keyword mapped to less than Pmax web pages is selected. At step 530, the keyword is mapped to the web page corresponding to next highest listing position that was either not mapped by the processing at step 330 of algorithm 300 or was not retained, i.e. was unmapped, as a result of the processing at steps 505-520, provided that the web page has less than Kmax keywords already mapped to it.

At step 535, a determination is made as to whether there is another keyword that is mapped to less than Pmax web pages that can be further mapped. If so, then processing returns to step 525 and if not then the method ends.

Figure 6:
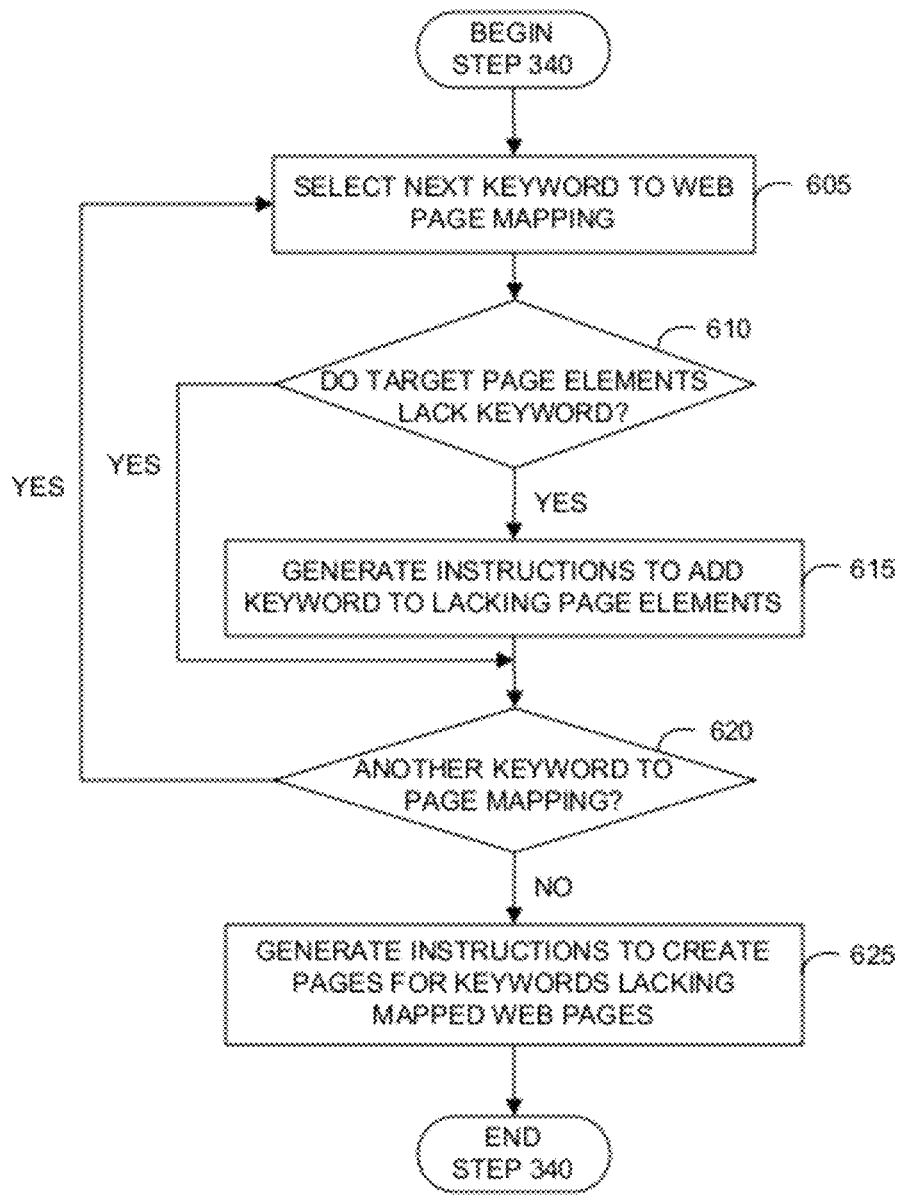
FIG. 6 is a simplified flowchart of a method for generating instructions to be performed for web pages in a domain.

FIG. 6 is a simplified flowchart of a method for generating instructions to be performed for web pages in a domain. The method for generating instructions is performed iteratively for each keyword to web page mapping. Steps 605-615 generate instructions, each of which specifies a change to be made to the web code of the web page or to the URL of the web page, that is specific to a single keyword. These instructions relate to what are commonly referred to as "on-page, keyword-specific ranking factors" that search engines take into account when calculating page rankings.

At step 605 SEO server 130 selects the next keyword to web page mapping. For the first iteration the first keyword to web page mapping is selected. In a preferred embodiment, the keyword to web page mappings are ordered by descending estimated traffic or, if available, by estimated revenue. Thus, instructions for more valuable keyword mappings are created first and rank higher in the generated instruction list, while instructions for less valuable keyword mappings are created later in the process and receive a lower ranking. Within a given keyword mapping there may be multiple instructions across multiple page elements. These instructions are ranked relative to each other based on a ranking of the page elements, e.g. the URL and Title tag of a page are more valuable than the meta description and meta keywords tags and are thus ranked higher.

At step 610 SEO server 130 analyzes the web page in the keyword to web page mapping to determine which of a target set of web page elements, also referred to simply as "page elements", do not refer to the mapped keyword. Table 2 below gives one target list of page elements, with a instruction, corresponding to each page element, that is generated in the case that the page element does not include the mapped keyword. For example, if the web page URL does not include the mapped keyword then, at step 615 below, an instruction will be generated to add the mapped keyword to the web page URL.

TABLE 2

Page Elements and their Corresponding Instructions

| Page Element | Instruction Generated |
| --- | --- |
| URL | Add <keyword> to the URL |
| Title Tag | Add <keyword> to the Title Tag |
| H1 Tag(s) | Add <keyword> to the H1 Tag |
| Meta Description | Add <keyword> to the Meta Description Tag |
| Meta Keywords | Add <keyword> to the Meta Keywords Tag |

TABLE 2-continued

Page Elements and their Corresponding Instructions

| Page Element | Instruction Generated |
|---|---|
| Internal links (aka Anchor Text, Link Label, Link Title) | Three attributes of internal links are analyzed: the anchor, or link, text, the title attribute (the pop-up that can happen when mousing-over a link), and the href HTML tag that specifies the linked web page. If, for a given link, either the title or the anchor text do not contain the keyword assigned to the linked web page, the href, then an instruction is generated recommending that it be added. Note that unlike the other instructions thus far, this one is based not on the page that the link is found on, but rather the page that the link points to (i.e. the page that would appear if a user clicks the link), which is found in the href attribute of the anchor tag. |
| General | Add web page corresponding to <keyword> |

At step 615, SEO server 130 generates an instruction to add the mapped keyword to those target page elements in the mapped web page that lack the mapped keyword. In generating an instruction, the term <keyword> in Table 2, above, is replaced with the actual keyword. Thus, for example, if the mapped keyword being analyzed for is "bosses day" then the instruction generated for the target page element Title Tag is to "Add "bosses day" to the Title Tag in the event that the Title Tag didn't already include the keyword "bosses day". As a refinement, in one embodiment, an instruction may be generated to add only a portion of a keyword to a page element in some cases. For example, using the above example, when generating instructions for "bosses day" if the word "day" is present in the Title tag but not "bosses", the generated instruction would specify that "bosses" be added to the tag. In another embodiment, multiple instructions may be generated for a given page element, especially if the keyword in question is composed of several words. For example, if when generating instructions for "Avatar: The Last Airbender DVD" we found "Last" in a page element we would generate an instruction to add "Avatar" and another to add "Airbender DVD". In yet another embodiment, certain relatively unimportant words, commonly referred to as "stop words", such as "the", "a", and other articles, which are generally ignored or given low priority by search engines, may be omitted from the instructions.

Thus, the instructions generated at step 615 effectively comprise a "to do" list, or task list, that a webmaster can implement in order to optimize, or target, the content of each web page in the domain to each of the keywords mapped to the web page.

At step 620 a determination is made as to whether there is another keyword to web page mapping to be processed. If so, then processing returns to step 605 and if not then processing continues at step 625.

At step 625 the keyword to web page mappings are compared to the list of keywords to determine if there is a keyword that has not been mapped to a single web page. For each such keyword a instruction to create a new web page to which the keyword can be mapped is generated.

As previously discussed, the instructions listed in Table 2 have been empirically shown to improve the position of listings and thereby increase traffic to the web pages corresponding to the listings. That is, implementing the instructions for a web page will generally improve the page ranking, i.e. the position of a listing corresponding to the web page within a SERP. With the exception of the last instruction, adding a web page as described with reference to step 625, the instructions optimize a web page for "on-page, keyword-specific ranking factors" that will typically improve the web page's page ranking by search engines, i.e. improve its position in a SERP. Additional on-page, keyword specific instructions can be generated, for example, an instruction specifying the use of the keyword as the first word(s) of the title tag, or an instruction adding the keyword in comment tags. Additionally, instructions that optimize for on-page, non keyword ranking factors can be generated. These instructions do not involve a specific keyword but can greatly affect page rank. Such instructions include updating a web page to improve recency, or freshness, and adding external-pointing links to a web page. Thus, the list of page elements optimized for, given in Table 2, is non-limiting and additional page elements and other types of instructions may be added without departing from the scope or spirit of the present invention.

It will be understood that each block of the flowchart illustrations in FIGS. 3-6, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps that implement the actions specified in the flowchart block or blocks to be performed by the processor to produce a computer-implemented process or method. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustrations may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems that perform the specified actions or steps, or combinations of special purpose hardware and computer instructions.

Figure 7:
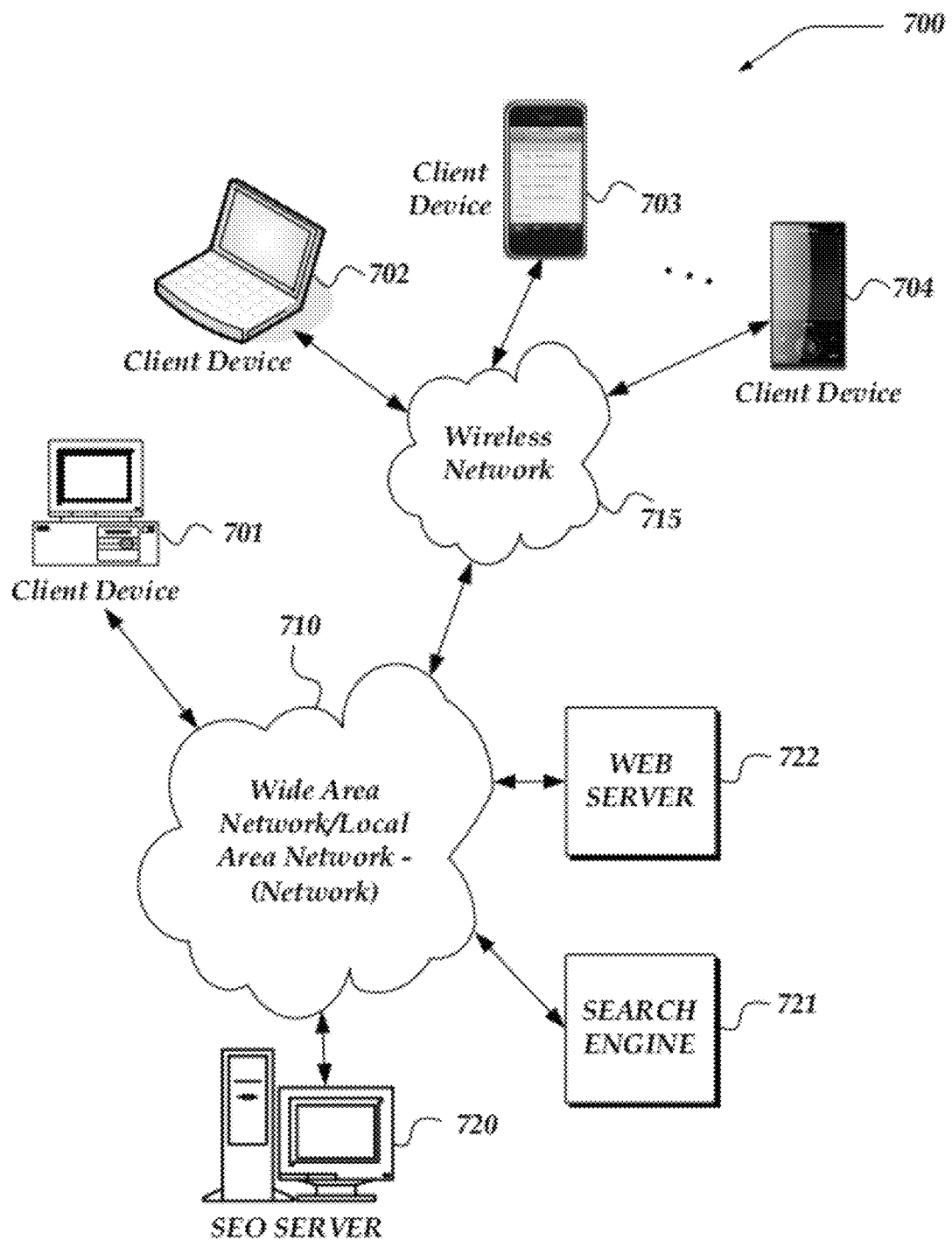
FIG. 7 is a system diagram that shows components of one exemplary operating environment in which the invention may be practiced.

FIG. 7 is a system diagram that shows components of one exemplary operating environment in which the invention may be practiced. Not all of the components in exemplary operating environment 700 may be required to practice the invention, and variations in the arrangement and types of the components may be made without departing from the spirit or scope of the invention. System 700 includes a wide area network ("WAN")/local area network ("LAN")-(network) 710, a wireless network 715, client devices 701-704, a SEO server 720, a search engine 721 and a web server 722.

Generally, client devices 701-704 include any computing devices that are capable of receiving and sending messages over a network, such as network 710 and/or wireless network 715 including personal computers, multiprocessor systems, microprocessor-based or programmable consumer electronics, network PCs, or the like. Client devices 701-704 also include mobile devices such as mobile telephones, smart phones, display pagers, radio frequency (RF) devices, infrared (IR) devices, personal digital assistants (PDAs), handheld computers, laptop computers, tablet computers, integrated devices combining one or more of the preceding devices, or the like.

Client devices 701-704 may include client application programs that send and receive content to/from other computing devices. Examples of application programs include calendars, browsers and email clients and so forth. A Web-enabled client device can communicate across the Web. It may include a browser application that is configured to receive and to send web pages, web-based messages, or the like. The browser application may receive and display graphics, text, multimedia, or the like, employing a web-based language, including a wireless application protocol messages (WAP), or the like.

Specifically, both user client computer 115 and webmaster client computer 155 are each embodiments of client devices 701-704. Network 160 is an embodiment of network 710 or wireless network 715 or a combination of both. Further, SEO server 130 is an embodiment of SEO server 720, search engine 120 is an embodiment of search engine 721 and web server 140 is an embodiment of web server 722.

Network 710 is configured to couple SEO server 720, search engine 721, web server 722, and client device 701 with other computing devices, including through wireless network 715 to client devices 702-704. Network 710 can include the Internet in addition to local area networks (LANs), wide area networks (WANs), private networks, and the like.

Wireless network 715 is configured to couple client devices 702-704 with network 710. In essence, wireless network 715 may include virtually any wireless communication mechanism by which information may travel from client devices 702-704 to another computing device or to another network.

SEO server 720, search engine 721, and web server 722 (referred to collectively as servers 720-722) represent network computing devices that are configured to receive messages from client devices 701-704 to respond to messages from client devices 701-704 and to perform a variety of functions on behalf of client devices 701-704. Search engine 721 and web server 722 are capable of interoperating with client devices 701-704 and with SEO server 720 using standard Web and Web services protocols such as HTTP. Search engine 721 and/or web server 722 may be implemented, for example, as server computers, server computer farms, Web services, cloud services and the like. In general, however, the specific design and implementation of both search engine 721 and web server 722 is outside the scope of the present invention.

Network computing devices that may operate as SEO server 720 include but are not limited to personal computers, desktop computers, multiprocessor systems, microprocessor-based or programmable consumer electronics, network PCs, servers, network appliances, and the like. Further, a network computing device that may operate as SEO server 720 is not limited to a single network computing device; for example, a plurality of network devices may be configured to perform the functions of SEO server 720. One such configuration is a "server farm" that includes multiple server computers operating cooperatively, each performing some aspect of the processing associated with SEO server 720. One embodiment of the software modules that perform SEO server 720 functions is described with reference to FIG. 8 below.

SEO server 720 is capable of running application programs ("applications"). Applications that may be run by SEO server 720 include database programs, customizable user interface programs, security applications, encryption programs, VPN programs, web servers, applications servers, customer relationship management (CRM) systems, and so forth.

SEO server 720 typically provides web services which include any of a variety of network services that are configured to provide content, including messages, over a network to another computing device. Thus, web services include for example, an application server, a web server, a messaging server, a File Transfer Protocol (FTP) server, a database server, a content server, or the like. Web services may provide the content including messages over the network using any of a variety of formats, including, but not limited to WAP, HDML, WML, HTML, XML, JSON, SOAP or the like. Web services may also include server-side scripting languages such as PHP, Python, and Java servlets. Web services may also include the server side of the Ajax web development method that enables a server to asynchronously respond to Ajax requests.

SEO server 720 includes data storage for storing program code and data. Data storage may include virtually any mechanism usable for storing and managing data, including but not limited to a file, a folder, a document, a web page or an application, such as a database, digital media including digital images and digital video clips, and the like.

Data storage may further represent a plurality of different data stores. For example, data storage may represent a customer database, a web page database, a instruction database, and a keyword database such as those described below in conjunction with FIG. 8. Further, data storage may also include network storage or cloud storage in which the physical storage media is accessed across a network.

Figure 8:
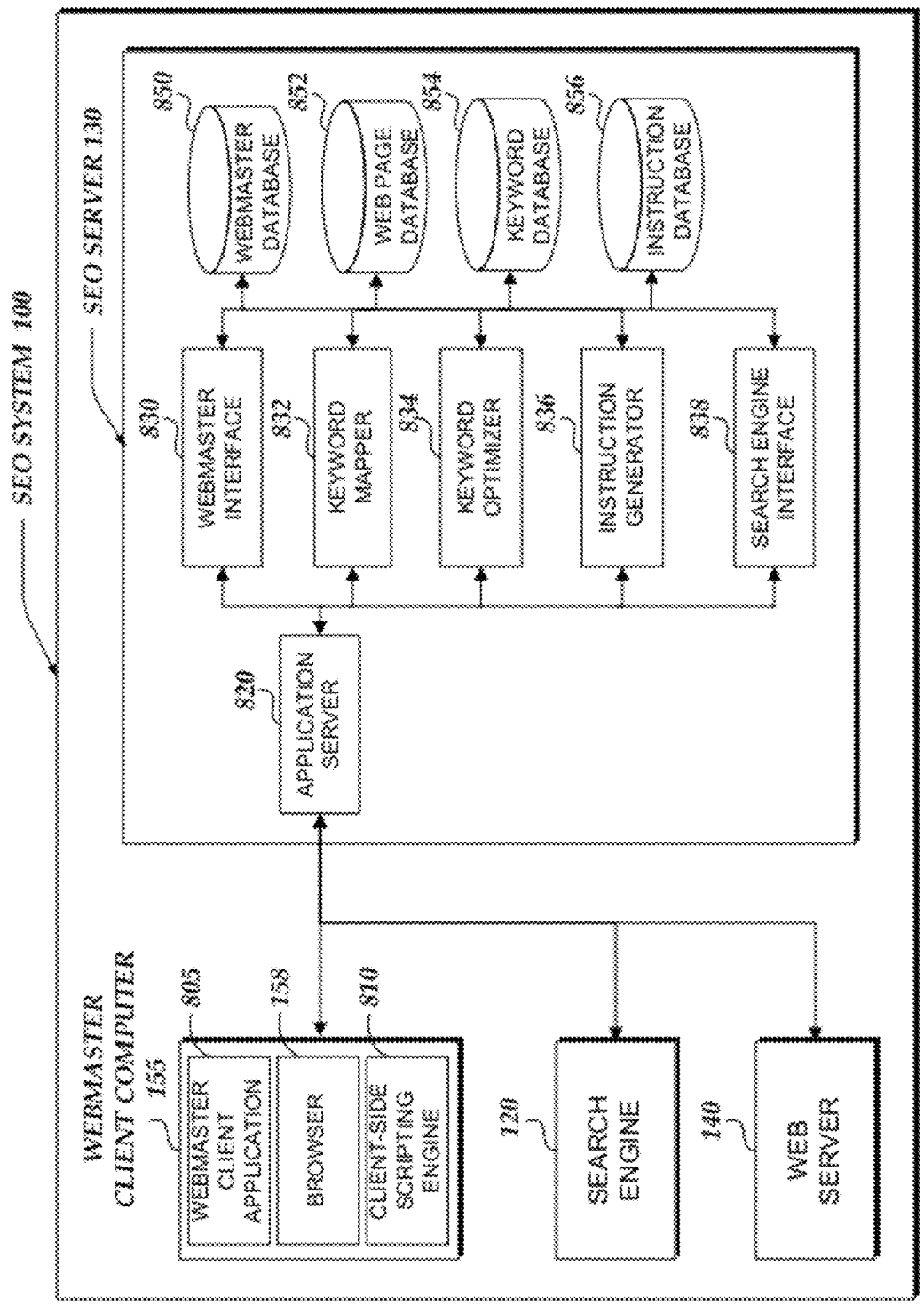
FIG. 8 is a block diagram that depicts the software modules of a search engine optimization server.

FIG. 8 is a block diagram that depicts the software modules of a search engine optimization server. The software modules of search engine 120 and web server 140 are outside the scope of the present invention and are not discussed further herein.

In a preferred embodiment, webmaster 150 interacts with SEO server 130 using a webmaster client application 805 that is downloaded to web browser 158 from an application server 820 that runs in SEO server 130. In a preferred embodiment, webmaster client application 805 is a Web application, that is written using standard Web programming languages such as HTML, JAVASCRIPT, and JAVA, and is executed by browser 158 running in webmaster client computer 155.

Browser 158 is typically a standard, commercially available, browser such as MOZILLA FIREFOX or MICROSOFT INTERNET EXPLORER. Alternatively, it may also be a client application configured to receive and display graphics, text, multimedia, and the like, across a network.

In one embodiment, browser 158 interacts with a client-side scripting engine 810 that executes client-side scripting instructions written in a client-side scripting or programming language such as JAVASCRIPT® from ORACLE CORPORATION of Redwood Shores, Calif., the Java open source programming language, ACTIVEX® from the MICROSOFT CORPORATION of Redmond, Wash., and the like. In one embodiment, browser 158 is configured to use the Ajax (asynchronous JavaScript and XML or JSON) web development techniques that enable Web browsers to asynchronously request incremental pieces of information from the server instead of whole pages.

In one embodiment, when webmaster 150 accesses SEO server 130 using webmaster client application 805, SEO server 130 downloads web pages in HTML format to browser 158 for viewing and interactive use. To perform some of the advanced client-side interactive functions, described with respect to FIGS. 2A-C, the web pages may include client-side scripting instructions. Typically, such client-side scripting instructions are embedded in HTML web pages and are interpreted or executed by client-side scripting engine 810 to perform functions not available through HTML commands such as advanced graphics, database access, and computations.

In one embodiment, JavaScript is used as a client-side scripting language. JavaScript is standardized by the European Computer Manufacturers Association (ECMA) and is supported by most commercial browsers including MOZILLA FIREFOX, MICROSOFT INTERNET EXPLORER AND APPLE SAFARI.

Webmaster client application 805 issues HTTP requests to and receives HTTP responses from application server 820 via browser 158. Application server 820 receives the HTTP requests and invokes the appropriate SEO server 130 software module to process the request. Application server 820 may be a commercially available application server that includes a web server that accepts and processes HTTP requests transmits HTTP responses back along with optional data contents, which may be web pages such as HTML documents and linked objects (images, or the like). In addition, browser 158 may use Ajax to issue requests for XML or JSON-coded information that is delivered asynchronously by application server 820. Henceforth, the term request message refers to a message sent by browser 158 using HTTP, Ajax or other client-server communications method to SEO server 130. And a response message refers to a message sent in response, typically using the same communications method, by application server 820 running in SEO server 130.

Application server 820 establishes and manages webmaster 150 sessions. Typically application server 820 assigns each session a unique session id. A session lasts from the time webmaster 150 logs in, or accesses SEO server 130, until the time webmaster 150 logs out or stops interacting with SEO server 130 for a specified period of time. In addition, application server 820 manages server applications and provides database connectivity.

Upon request by browser 158, application server 820 provides the HTML, JavaScript and other browser-executable code that make up webmaster client application 805.

SEO server 130 includes a webmaster interface 830, a keyword mapper 832, a keyword optimizer 834, an instruction generator 836, and a search engine interface 838. SEO server 130 further includes four databases: a webmaster database 850, a web page database 852, a keyword database 854, and an instruction database 856. It may be appreciated that each of the abovementioned databases may be implemented as one or more computer files spread across one or more physical storage mechanisms. In one embodiment, each of the abovementioned databases is implemented as one or more relational databases and is accessed using the structured query language (SQL).

Each of webmaster interface 830, keyword mapper 832, keyword optimizer 834, instruction generator 836, and search engine interface 838 may include or share a commercial database management system (DBMS) to access and search for data and objects that reside in the database. In a preferred embodiment, the DBMS is a relational DBMS (RDBMS) such as ORACLE® from the Oracle Corporation, SQL Server from the Microsoft Corporation, or the like. However, other database managers may also be used.

Webmaster interface 830 interacts with webmaster client application 805, i.e. it performs the back-end server processing. Webmaster interface 830 processes requests to upload keywords, display and update keywords and to generate, display and download instructions intended for webmaster 150. Webmaster interface 830 responds to requests to provide user interfaces such as the exemplary interfaces given in FIGS. 2A-2C.

Keyword mapper 832 maps keywords stored in keyword database 854 to web pages in an identified domain. It performs the processing associated with the method depicted in FIG. 4. For each keyword in keyword database 856, keyword mapper 832 stores a record of which web page(s) it is mapped to. Keyword mapper 832 also gathers the web pages of the identified domain and stores them in web page database 850.

Keyword optimizer 834 optimizes the mapping of keywords to web pages in accordance with the method depicted in FIG. 5. Keyword optimizer 834 modifies the mapping keywords to web pages stored in keyword database 854. Keyword optimizer estimates the traffic for each keyword to web page combination as described with reference to EQUATION 1 and stores the resulting estimates in keyword database 854.

Instruction generator 836 generates a list of instructions, such as the one given in display instructions interface 240, for web pages in an identified domain. Instruction generator 836 performs the instruction generation method depicted in FIG. 6. Instruction generator 836 analyzes a web page and generates zero or more instructions, such as those described with reference to Table 2. Instruction generator 836 stores each list of instructions it generates in instruction database 856.

Search engine interface 838 obtains interacts with search engines to gather search engine usage data, search engine results data and keyword revenue data as necessary. This includes gathering SERPs for specific keywords from leading search engines and stores the SERPs in web page database 852. Further, search engine interface 839 is capable of obtaining keywords, and search engine usage data including traffic volumes from search engines. For example, if webmaster 150 doesn't provide keywords for an identified domain, search engine interface 838 can obtain data including a list of keywords relevant to the domain from the GOOGLE ANALYTICS web site or from another comparable service.

In an alternative embodiment, search engine interface 838 may be downloaded and run in a client computer such as user client computer 115. This is because scraping of search engines is a resource intensive task and distributing this process across a plurality of computer processors, such as those of users of SEO system 100, systems allows the overall system to scale further. In this embodiment, the downloaded search engine interface 838 running in user client computer 115 requests keywords from SEO server 130. SEO server 130 then provides one or more keywords to the downloaded search engine interface 838 which in turn performs the corresponding SERP scraping and finally delivers the SERPs back to SEO server 130 which stores them in web page database 852.

Webmaster database 850 stores a record for each webmaster, or customer, that uses the service provided by SEO server 130, referred to hereinafter as a customer record. A customer record includes inter alia a customer name, customer contact information, information specifying the domains managed by the customer, and may include means of payment information. Name and contact information is typically obtained during registration. Typically, a webmaster registers with SEO server 130 the first time he/she uses the service. Webmaster database 850 also stores a record for each campaign created by a customer, which includes the name of the domain to be analyzed, the campaign name and information about each time the campaign is analyzed by SEO server 130.

Web page database 852 stores the contents of web pages in a domain specified by webmaster 150 for which an instruction list is to be or has been generated. Web page database 852 may also store traffic and/or revenue information about each web page as well as a specification of the applicable time period for the traffic and/or revenue information. Traffic information is typically the measured or estimated number of visitors or unique visitors to the web page for a month. Analogously, revenue information is typically the actual or estimated revenue in US dollars (or in another currency) that resulted from visits to a web page. Web page database 852 may store multiple traffic and/or revenue measurements for a web page, thus enabling historical comparison of results.

Keyword database 854 stores lists of keywords received from webmaster 150 as well as the traffic volumes and revenue data, if available, for each keyword. In addition to storing keywords received from webmaster 150, SEO server 130 may also gather keywords from various sources and provide them on request to webmaster 150 for inclusion; such externally gathered keywords are also stored in keyword database 854.

Instruction database 856 stores a list of instructions generated for a domain along with the date and time and any other execution data each time SEO instruction generation algorithm 300 executes.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A server-implemented method for search engine optimization, comprising:
 receiving (1) an identifier that identifies a domain, wherein a domain is a related collection of web pages, and wherein each web page comprises a plurality of web page elements, (2) a plurality of keywords for analysis relative to a search engine, where the search engine receives a keyword as input and generates as output search engine results pages that include a sequence of listings of web pages, wherein each listing corresponds to a web page and wherein each listing has a unique listing position and higher listing positions are more valuable than lower listing positions, (3) for each received keyword, a corresponding search volume that specifies the number of searches performed by the search engine for the received keyword over a defined period of time, and (4) for each received keyword, an average revenue per visit resulting from e-commerce transactions made by visitors to the identified domain, wherein said visits result from searches performed by the visitors using the received keyword; and
 for each received keyword:
  gathering search engine results pages from a search engine for the received keyword;
  determining listing positions for the received keyword in the identified domain from the gathered search engine results pages, wherein a listing position for a keyword in the identified domain is the position of a listing in the gathered search engine results pages whose corresponding web page is within the identified domain;
  selecting the highest listing position for the keyword in the identified domain from among the determined listing positions;
  mapping the received keyword to the web page that corresponds to the selected listing position in the identified domain;
  estimating, for each of the keywords mapped by said mapping to the designated web page, the revenue due to e-commerce transactions associated with the designated web page attributed to searches performed using the respective keyword, wherein said estimating is based on the corresponding search volume for each mapped keyword;
  limiting the number of keywords mapped by said mapping to a designated web page within the identified domain to a specified maximum value, wherein said limiting is based on the estimated revenue attributed to each of the keywords mapped by said mapping; and
  generating at least one instruction to modify a web page element in the web page that corresponds to the selected listing position.

2. The method of claim 1 wherein said limiting the number of keywords mapped by said mapping to the designated web page is based on the corresponding search volume for each of the keywords mapped by said mapping to the designated web page.

3. The method of claim 1 further comprising estimating, for each of the keywords mapped by said mapping, the traffic to the designated web page attributed to searches performed using the respective keyword, and wherein said limiting the number of keywords mapped by said mapping to the designated web page is based on the estimated traffic to the designated web page attributed to each of the keywords.

4. The method of claim 1 wherein said web page elements are selected from the group consisting of the web page URL, title tag, H1 Tag, meta description, meta keywords, body tag, and internal links.

5. The method of claim 4 wherein said at least one instruction to modify a web page element specifies text to incorporate into the web page element.

6. The method of claim 1 further comprising generating an instruction to create a web page corresponding to a keyword if the keyword is not mapped by said mapping to at least one web page in the identified domain.

7. The method of claim 1 further comprising delivering the generated instructions to a client device.

8. A network computing device for search engine optimization, comprising:
 a transceiver to send and receive data over a network; and
 a processor that is operative to perform actions, comprising:
  receiving (1) an identifier that identifies a domain, wherein a domain is a related collection of web pages, and wherein each web page comprises a plurality of web page elements, (2) a plurality of keywords for analysis relative to a search engine, where the search engine receives a keyword as input and generates as output search engine results pages that include listings of web pages that correspond to the keyword and wherein each listing has a unique position and higher positions in the search engine results pages are more valuable than lower positions, (3) for each received keyword, a corresponding search volume that specifies the number of searches performed by the search engine for the received keyword over a defined period of time, (4) for each keyword, an average revenue per visit resulting from e-commerce transactions made by visitors to the identified domain, wherein said visits result from searches performed by the visitors using the received keyword; and
  for each received keyword:
   gathering search engine results pages from a search engine for the received keyword;

determining listing positions for the received keyword in the identified domain from the search engine results pages, wherein a listing position for a domain is the position of a listing in the gathered search engine results pages whose corresponding web page is within the identified domain;

selecting the highest listing position for the keyword in the identified domain from among the determined listing positions;

mapping the received keyword to the web page that corresponds to the selected listing position in the identified domain;

estimating, for each of the keywords mapped by said mapping to the designated web page, the revenue due to e-commerce transactions associated with the designated web page attributed to searches performed using the respective keyword, wherein said estimating is based on the corresponding search volume for each mapped keyword;

limiting the number of keywords mapped by said mapping to a designated web page within the identified domain to a specified maximum value, wherein said limiting is based on the estimated revenue attributed to each of the keywords mapped by said mapping; and generating at least one instruction to modify a web page element in the web page that corresponds to the selected listing position.

9. The network computing device of claim 8 wherein said limiting the number of keywords mapped by said mapping to the designated web page is based on the corresponding search volume for each of the keywords mapped by said mapping to the designated web page.

10. The network computing device of claim 9 further comprising estimating, for each of the keywords mapped by said mapping to the designated web page traffic to the designated web page attributed to searches performed using the respective keyword and wherein said limiting the number of keywords mapped by said mapping to the designated web page is based on the estimated traffic to the designated web page attributed to each of the keywords.

11. The network computing device of claim 8 wherein said web page elements are selected from the group consisting of the web page URL, title tag, H1 Tag, meta description, meta keywords, body tag, and internal links.

12. The network computing device of claim 11 wherein said at least one instruction to modify a web page element specifies text to incorporate into the web page element.

13. The network computing device of claim 8 wherein the processor is configured to perform actions, further comprising generating an instruction to create a web page corresponding to a received keyword if the keyword is not mapped by said mapping to at least one web page in the identified domain.

14. The network computing device of claim 8 wherein the processor is configured to perform actions, further comprising transmitting the generated instructions to a client device.

* * * * *